United States Patent [19]
Xiao et al.

[11] Patent Number: 6,153,709
[45] Date of Patent: Nov. 28, 2000

[54] CHIP RESISTANT, VIBRATION DAMPING COATINGS FOR VEHICLES

[75] Inventors: Hong Xiao, Farmington Hills; Gloria Hsu, Bloomfield Hills, both of Mich.

[73] Assignee: Essex Specialty Products, Inc., Auburn Hills, Mich.

[21] Appl. No.: 09/237,453

[22] Filed: Jan. 26, 1999

Related U.S. Application Data

[60] Provisional application No. 60/072,429, Jan. 26, 1998.

[51] Int. Cl.$^7$ .................................................. C08G 18/58
[52] U.S. Cl. ......................... 525/528; 525/903; 528/59; 528/60; 528/65; 528/73; 427/386; 428/418; 428/423.1; 524/775; 524/789
[58] Field of Search ................................. 525/528, 903; 528/73, 60, 65, 59; 427/386; 428/418, 423.1; 524/775, 789

[56] References Cited

U.S. PATENT DOCUMENTS

| | | | |
|---|---|---|---|
| 3,169,881 | 2/1965 | Bodine, Jr. | 117/45 |
| 3,365,516 | 1/1968 | Prescott et al. | 260/830 |
| 3,518,217 | 6/1970 | Irwin et al. | 260/29.2 |
| 3,894,169 | 7/1975 | Miller | 428/425 |
| 4,143,009 | 3/1979 | Dewey | 521/178 |
| 4,346,782 | 8/1982 | Böhm | 181/207 |
| 4,608,313 | 8/1986 | Hickner et al. | 525/528 |
| 4,758,638 | 7/1988 | Hickner et al. | 525/510 |
| 4,870,142 | 9/1989 | Czerwinski et al. | 525/528 |
| 4,910,270 | 3/1990 | Maekawa et al. | 525/532 |
| 4,923,934 | 5/1990 | Werner | 525/528 |
| 5,331,062 | 7/1994 | Sorathia et al. | 525/454 |
| 5,368,916 | 11/1994 | Fujimoto et al. | 428/215 |
| 5,391,681 | 2/1995 | Mühlebach et al. | 528/45 |
| 5,435,842 | 7/1995 | Mukaida et al. | 106/672 |

FOREIGN PATENT DOCUMENTS

| | | | |
|---|---|---|---|
| 077987 B1 | 5/1983 | European Pat. Off. | G10K 11/16 |
| 077987A1 | 5/1983 | European Pat. Off. | G10K 11/16 |
| 407157 A2 | 1/1991 | European Pat. Off. | C08G 59/22 |
| 407157A2 | 1/1991 | European Pat. Off. | C08G 59/22 |
| 443812A1 | 8/1991 | European Pat. Off. | C09D 5/03 |
| 551 063 A1 | 7/1993 | European Pat. Off. | C09D 163/00 |
| 551063A1 | 7/1993 | European Pat. Off. | C09D 163/00 |
| 590 975 A1 | 4/1994 | European Pat. Off. | C08G 59/18 |
| 1198004 | 7/1970 | United Kingdom | B32B 33/00 |
| 2285049A | 6/1995 | United Kingdom | C09D 163/00 |
| WO 99/16840 | 4/1999 | WIPO | C09D 163/00 |

OTHER PUBLICATIONS

Chemical Abstract, 121:37079a, "Alternatives to PVC", 1993.

Chemical Abstract, 92:95675k, "New undercoatings for rust proofing automobiles and new corrosion–reducing waxes" 1973.

Chemical Abstract, 119:74663r, "Anticorrosive thick epoxy resin coatings" 1988.

Derwent Abstract, 68–12574Q/00, Belgium 712,355, "Cured epoxy sound absorbing materials made by curing epoxy resins with propylene oxide amines" 1968.

Derwent Abstract, 90–059557/09, German 271,911, "Filled epoxy resin–based echo– or boom–removing materials contain epoxy resin with epoxide equivalent 300–600 and molecular weight 600–1200, combined with DBP and isobutyl and/or phenyl glycidyl ether" 1989.

Derwent Abstracts, 78–47960A/27, German 2657969, "Tough resilient polyester or epoxy resin optionally containing fillers used as impact–resistant, anti–corrosive, noise reducing coating, 1978.

Derwent Abstract, 80–19456C/11, Japan 55016073, "Epoxy resin compsn. Contg. Heat–activated hardener and foaming agent—for reinforcement, vibration damping and sound–proofing of metal sheets" 1980.

Derwent Abstract, 80–63277C/36, Japan 55098263, "Sound insulating coating compsn.—comprising vehicle contg. Styrene–butadiene rubber and/or petroleum resin, filler, alkali modified sludge and vulcaniser" 1980.

Derwent Abstract, 89–217488/30, Japan 01156151, "Sound proofing compsn. For fixing parts to vehicle–comprises photocurable resin binder and particulate filler, giving specified hardness" 1989.

Derwent Abstract, 90–221277/29, Japan 02150484. "Structural adhesive for car assembly line—consisting of rubber –modified epoxy resin, other epoxy resins and latent curing agent" 1990.

Derwent Abstract, 91–083232/12, Japan 03028234, "Vibration damping material with reduced temp. Shift—is obtd. By compounding mica and chopped glass strands with liq. Epoxy resin" 1991.

Derwent Abstract, 93–365304/46, Japan 05271389. One–pack flexible epoxy resin compasn. for sealing cpds. And adhesives—contains epoxy resin, ketimine, modified silicone resin and its catalyst and a dehydrant, is storage stable, easily cured and has good flexibility 1993.

Derwent Abstract, 94–269599/33, Japan 06200123, "Epoxy resin curable compsn. contg. hydrosilyl cpd. And silica powder—used in sealants, adhesives and coatings for automobile underbodies" 1994.

(List continued on next page.)

*Primary Examiner*—Rachel Gorr
*Attorney, Agent, or Firm*—Tim Stevens; Norman L. Sims

[57] ABSTRACT

A formulation for covering vehicle panels, such as the inner fenders or floor boards of an automobile, with a chip resistant, vibration damping coating. The formulation includes a blocked polyurethane prepolymer (or a blocked polyisocyanate and a polyol), an epoxy resin, a filler and a plasticizer. A method for forming a chip resistant, vibration damping coating on such a panel including the steps of applying a coating mixture to the panel, the coating mixture including a blocked polyurethane prepolymer (or a blocked polyisocyanate and a polyol) and an epoxy resin, and then heating the panel to form the coating. An improved vehicle panel, wherein the improvement is a polyurethane modified epoxy coating (or a coating which is an interpenetrating network of polyurethane resin and epoxy resin) on the panel.

19 Claims, No Drawings

OTHER PUBLICATIONS

Derwent Abstract, 95–213001/28, Japan 07126347, "Compen. for damping materials to suppress vibration in automobiles, trans, etc.—contg. Epoxy resins, acrylonitrile/conjugated diene rubber contg. carboxyl Gp., inorganic filler and curing agent" 1995.

Derwent Abstract, 97–115452/11, Japan 09003305, "Damping material compsns. with good performance in high frequency region—comprises epoxy resin, acrylonitrile–conjugate diene copolymer rubber, inorganic filler, particulate or needle–like additive with specified dielectric constant and curing agent" Jan. 1997.

Derwent Abstract, 92–148180/18, Romania 100918. "Corrosion and sound proofing compsn.—consists of epoxy resins mixed with dehydrated coal tar incorporating fly ash" 1991.

Derwent Abstract, 89–186000/26, Germany 267696, "Gripping force measurement sensor for triple finger gripper—has strain sensors on bars connecting star wheel inner and outer rings" 1989.

Derwent Abstract, 83–44608K/19, EP–13 77987, "Vibration damper bondable to panels e.g. of cars—comprises three–layered laminate of meltable bonding layer, viscoelastic layer and constraining layer e.g. of epoxy resin" 1983.

Derwent Abstract, 91–010113/02, EP–407157, "Vibration–damping material with excellent performance—comprises epoxy resins, curing agent and filler" 1991.

Derwent Abstract, 93–220829/28, EP–551063, "Protective coating compsns. for under–body coatings—comprising solid hardener, filler and di:epoxide resin(s) avoiding the use of PVC plastisols" 1993.

Derwent Abstract, 94–111357/14, EP–590975, "Low viscosity, solvent free, one component epoxy adhesives—comprising polyfunctional epoxy cpd. Liq. At room temp., reactive diluent and microencapsulated amine latent curing agent" 1994.

Derwent Abstract, 78–87987A/49, Germany 2723491, "Protective coating compsns., e.g. for cars—contain viscous–elastic unhardened plastics esp. Polyester or epoxy resin" 1978.

Atomotive Technology Group, inc., "Performance Benefits Of A New Spray Appplied Automotive Damping Material", IBC '97, pp. 145–150, 1997.

CHIP RESISTANT, VIBRATION DAMPING COATINGS FOR VEHICLES

CROSS REFERENCE STATEMENT

Priority is claimed from U.S. Provisional Application Number 60/072,429 filed Jan. 26, 1998 entitled "Chip Resistant, Vibration Damping Coatings For Vehicles."

BACKGROUND OF THE INVENTION

The invention relates to a formulation for covering substrates, such as, vehicle panels with a chip resistant, vibration damping coating, a method for forming such a coating and an improved panel having such a coating.

The formed sheet steel wheel wells and floor boards of vehicles, such as automobiles, buses and trucks, are exposed to flying stones which tend to chip the coating thereon and thereby promote corrosion of the underlying steel. Chip resistant coatings, such as coatings of polyvinylchloride, are therefore used to protect these steel surfaces.

When a vehicle travels along a road, the tires of the vehicle generate considerable noise. In addition, the irregularities of the road and the mechanisms of the vehicle, such as the engine and drive train, tend to vibrate the vehicle. The chip resistant coatings currently applied to the underside of a vehicle do not damp such noise and vibration as much as is desired. Considerable effort is taken in the manufacture of luxury automobiles to reduce the noise and vibration sensed by the driver and passengers of such an automobile. For example, noise and vibration absorbing mats are often applied to the interior side of the panels of a luxury automobile underside even though such mats are expensive and are difficult to affix and shape.

It would be an advance in the art of reducing the noise and vibration sensed by the driver and passengers of a vehicle if a coating were invented which was both chip resistant and an improved vibration damper and which could be used not only as a chip resistant undercoating but also applied to the inner sides of the panels of a vehicle.

SUMMARY OF INVENTION

The instant invention is a formulation for covering substrates, such as vehicle panels, with a chip resistant, vibration damping coating, a method for forming such a coating and an improved panel having such a coating. The formulation includes a blocked polyurethane prepolymer (or a blocked polyisocyanate and a polyol), an epoxy resin, a filler and a plasticizer. The method includes the steps of applying a coating mixture to a substrate, the coating mixture including a blocked polyurethane prepolymer (or a blocked polyisocyanate and a polyol) and an epoxy resin, and then exposing the substrate to conditions to cure the coating. The invention is also an improved vehicle panel, wherein the improvement is a polyurethane modified epoxy coating or a coating which is an interpenetrating network of polyurethane resin and epoxy resin on the panel.

DETAILED DESCRIPTION OF THE INVENTION

Blocked polyurethane prepolymer and blocked isocyanate/polyol systems are well known in the coating art. Oertel, Polyurethane Handbook, 1985, 510–529, herein fully incorporated by reference. It is also known to combine blocked polyurethane prepolymers with amine cured epoxy resin to produce polyurethane modified epoxy systems which can be heat cured to form a flexible and elastic coating. Id at 527. Polyurethane based paint is state of the art in the vehicle industry. Id at 519. Blocked polyurethane systems are known for use as chip proof primers and intermediate coatings in the vehicle industry. Id at 523.

In one embodiment, the instant invention is a formulation for covering substrates, such as vehicle panels, with a chip resistant, vibration damping polyurethane modified epoxy coating, comprising: (a) a blocked polyurethane prepolymer or a mixture of a blocked polyisocyanate and a polyol; (b) an epoxy resin; (c) a filler; and (d) a plasticizer.

In another embodiment, the instant invention is a method of forming a chip resistant, vibration damping coating, comprising the steps of: (a) applying a coating mixture to a panel of a vehicle, the coating mixture comprising a blocked polyurethane prepolymer and an epoxy resin or a mixture of a blocked polyisocyanate, a polyol and an epoxy resin; and (b) heating the panel to form the coating. Preferably, the formulation for the coating mixture also comprises a filler and a plasticizer.

More preferably, the formulation comprises from about 15 to about 25 percent of the blocked polyisocyanate prepolymer or from about 15 to about 25 percent of the mixture of the blocked polyisocyanate and the polyol, from about 30 to about 50 percent of the epoxy resin, from about 20 to about 50 percent of the filler and from abut 3 to about 10 percent of the plasticizer.

When the blocked polyurethane prepolymer is used, it is believed that the polyurethane polymer chain is cross-linked to the epoxy polymer chain when a common cross-linking agent is used such as a polyamine or a cyandiamide or dicyandiamide. When the blocked polyisocyanate and polyol mixture is used, it is undesirable to use polyamines or cyandiamides or dicyandiamide. It is not believed that there are any cross-links between the polyurethane polymer chain and the epoxy polymer chain when a catalytic curing agent for the epoxy resin is used such as boron trifluoride. Instead, it is believed that the polyurethane/epoxy coating comprises an interpenetrating network of polyurethane polymer and epoxy polymer chains.

In a yet further embodiment, the instant invention is an improved vehicle panel, wherein the improvement is coating on the panel, the coating comprising a polyurethane modified epoxy or an interpenetrating network of a polyurethane resin and an epoxy resin.

The method of the instant invention involves applying the formulated coating to a substrate, such as a vehicle panel. The substrate can be any substrate for which corrosion protection, abrasion protection, or sound damping or abatement is desired, such a substrate can be made of metal, plastic, fiber reinforced plastic and the like. The formulation can be used in a wide variety of industries including the automotive industry, appliance industry and construction industry. Such substrate can be part of a vehicle or part of an appliance such as a dish washer. The coating is particularly advantageous in that it is sprayable and can be sprayed on irregular shaped objects such as the panels of an automobile.

The formulation may further contain a plasticizer to modify Theological properties to a desired consistency. Any plasticizer suitable for use in polyurethane modified epoxy systems or in polyurethane/epoxy systems can be used. The plasticizer should be free of water, inert to isocyanate groups, and compatible with the polymer. Such material may be added to the reaction mixtures for preparing the prepolymer or the adduct, or to the mixture for preparing the final formulation, but is preferably added to the reaction mixtures for preparing the prepolymer, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, trichloropropylphosphate, epoxy plasticizers, toluene-sulfamide, chloroparaffins, adipic acid esters, xylene, 1-methyl-2-pyrrolidinone and toluene. The most preferred plasticizers are the phthlate plasticizers. The amount of plasticizer used is that amount sufficient to give the desired rheological properties and disperse the components in the formulation. Preferably the plasticizer is present in an amount of about 3 percent by weight or greater, more preferably about 5 percent by weight or greater based on formulation. The plasticizer is preferably present in an amount of about 15 percent by weight or less, and most preferably about 10 percent by weight or less based on the weight of the formulation.

The formulation may further comprise one or more fillers. Fillers are used to control the viscosity, rheology, shelf stability, specific gravity and cured performance properties, such as vibration damping, corrosion resistance, impact resistance and abrasion resistance. The fillers may be spherical or platy. As used herein platy means the particles have a high aspect ratio. High aspect ratio fillers include talc, mica and graphite. Preferred high aspect ratio fillers include Phologopite mica having a median particle size of about 20 to about 70 microns (micrometers) and most preferably about 50 microns (micrometers). High aspect ratio fillers are used to control vibration damping properties. Spherical fillers include carbonates. Spherical fillers are used to control density and rheology, viscosity and cost. Preferably a package of a spherical filler such as calcium carbonate and a high aspect ratio filler are both present. Preferably the filler is present in an amount of about 30 percent by weight or greater, and more preferably about 40 percent by weight or greater. Preferably the filler is present in an amount of about 60 percent by weight or less and more preferably about 50 percent by weight or less.

In another embodiment, the formulation may further comprise a reactive diluent such as mono-functional epoxide and other reactive diluents known to those skilled in the art. One preferred reactive diluent is tertiary butyl glycidyl ether.

The formulation of the invention may be a two-part or a one-part formulation depending on the curing agent and the temperature at which the curing agent begins to cure the epoxy resin. If the curing agent is reactive at room temperature, the formulation must be a two-part formulation and if the curing agent is reactive at significantly higher temperatures, the formulation can be a one or a two-part formulation with the cure initiated by exposing the formulation to heat.

The specific epoxy resin selected is not critical and can include aromatic and aliphatic types. In the embodiment where the formulation comprises a blocked polyisocyanate and a polyol the specific epoxy curing agent selected is also not critical as long as the epoxy system and the polyurethane system each cure during the heating of the coating. The preferred epoxy curing agent is boron trichloride amine complex. Preferred aromatic epoxy resins refer to epoxy resins having bisphenol moieties in the backbone of the epoxy resin. Representative of preferred bisphenol resins useful in this invention are those disclosed in U.S. Pat. No. 5,308,895 at column 8, line 6 and represented by Formula 6, relevant portions of such patent are incorporated herein by reference. The most preferred aromatic epoxy resins are bisphenol-A based epoxy resins and bisphenol-F based epoxy resins.

Preferred aliphatic epoxy resins are derived polyether chains which are preferably prepared from one or more alkylene oxides. Representative examples of these alipatic epoxy resins are those described in U.S. Pat. No. 5,308,895 at column 8, line 9 and formula 9 and the description thereof following, relevant portions of such description are incorporated herein by reference. Preferably the aliphatic epoxy resin contains in its backbone ethylene oxide, propylene oxide or a mixture thereof.

Most preferably, the epoxy resin is a mixture of bisphenol A type epoxy resin and aliphatic epoxy resin. A preferred aliphatic epoxy resin is DER™732 epoxy resin and DER™736 epoxy resin available from The Dow Chemical Company.

The formulation further comprises a curing agent for the epoxy resin. The curing agent can be any curing agent useful with epoxy resins and known to one skilled in the art. Representative curing agents are disclosed in U.S. Pat. No. 5,308,895 at column 11, line 8 to column 12 line 47 incorporated herein by reference. More preferably the curing agent is an amine terminated polyether, such as Jeffamine amine terminated polyether available from Huntsman Chemical, a boron trihalide, or a cyandiamide, a dicyandiamide or derivatives thereof. For the blocked polyurethane prepolymer formulations the most preferred curing agents are the dicyandiamides and the derivatives thereof. For the blocked polyisocyanate formulations the preferred curing agent is a boron trifluoride amine complex, such as Leecure brand 38-239B from Leepoxy Plastics.

The curing agent in relation to the epoxy resin is used in an amount such that the ratio of epoxy groups to epoxy reactive groups is about 0.7 to 1 to about 1.3 to 1. The curing agent may be present in an amount of from about 0.5 to about 7 percent by weight based on the amount of the total formulation. It is preferable that there be a slight excess of epoxy moieties to epoxy reactive moieties such that the range is about 1.05 to 1 to about 1.1 to 1.

The composition may further comprise a catalyst for the reaction of an epoxy resin with an epoxy curative compound. Such catalysts are well known to those skilled in the art, and include those described in U.S. Pat. No. 5,344,856, relevant portions incorporated herein by reference. The preferred classes of catalysts are the ureas, imidazoles, and boron trihalides with the ureas being the most preferred catalysts. Of the boron trihalides, boron triflouride (trichloride) is the most preferred because formulations using this catalyst demonstrate significantly better stability when compared to other boron trihalides. For the blocked polyurethane prepolymer formulations the epoxy catalyst preferably is modified aliphalitic and cycloaliphatic amines such as Ancamine brand 2441 catalyst from Air Products Corporation. The catalyst amount used may vary depending upon the desired reactivity and shelf stability. Preferably the catalyst is present in an amount of about 0.1 to about 5 weight percent based on the weight of the weight of the formulation.

The polyurethane prepolymer is made in the conventional manner, i.e., by reacting a polyisocyanate with a polyol. Preferably, two equivalents of polyisocyanate are reacted with about one equivalent of polyol. The resulting polyurethane prepolymer is then reacted with the blocking agent in the conventional manner. Most preferably, the polyisocyanate is toluene diisocyanate. However, methylene di-paraphenylene isocyanate (MDI) can also be used. Additional examples of useful polyisocyanates include ethylene diisocyanate, isophorone diisocyanate, bis(4-isocyanate cyclohexyl) methane, trimethyl hexamethylene diisocyanate, 1,4-tetramethylene diisocyanate, 1,6-hexamethylene diisocyanate, 1,12-dodecane diisocyanate, cyclobutane-1,3-diisocyanate, cyclohexane 1,3- and 1,4-diisocyanate and mixtures of these isomers; 1-isocyanato3,3,5-trimethyl 5-isocyanato methyl cyclohexane (see e.g., German Auslegeschrift No. 1,202,785); 2,4- and 2,6-hexahydrotolylene diisocyanate and mixtures of these isomers, hexahydrol,3- and/or 1,4-phenylene diisocyanate, perhydro 2,5'- and/or 4,4'-diphenyl methane diisocyanate, 1,3- and 1,4-phenylene diisocyanate, 2,4'- and 2,6-tolylene diisocyanate and mixtures of these isomers, diphenyl-methane 2,4'- and/or 4,4'-diisocyanate, naphthylene 1,5-diisocyanate, triphenylmethane 4,4',4"-triisocyanate, tetramethylxylene diisocyanates, polymeric derivatives of the previously described isocyanates, polyphenyl polymethylene polyisocyanates of the type obtained by condensing aniline with formaldehyde, followed by phosgenation and such as described, for example, in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789, 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. 3,567,763 and in German Patent 1,231,688 and reaction products of the aforementioned isocyanates with acetals as described in German Patent 1,072,385. Preferred polyisocyanates include diphenylmethane-4,4'-diisocyanate and polymeric derivatives thereof, isophorone diisocyanate, tetramethylxylene diisocyanate,1,6-hexamethylene diisocyante and polymeric derivatives thereof, bis(4-isocyanatocylohexyl)methane, and trimethyl hexamethylene diisocyanate.

Most preferably the polyol is a triol having a molecular weight of from 1,000 to 7,000. If a diol is used, its molecular weight is preferably from 1,000 to 6,000. In general, suitable polyols useful in the preparation of the blocked polyurethane prepolymer include, for example, polyether polyols, polyester polyols, poly(alkylene carbonate)polyols, hydroxyl-containing polythioethers, polymer polyols, and mixtures thereof. Polyether polyols are well known in the art and include, for example, polyoxyethylene, polyoxypropylene, polyoxybutylene, and polytetramethylene ether diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerin with propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Referring now to the blocked polyisocyanate formulation embodiment of the instant invention the polyisocyantes described before can be used in this embodiment, preferably the polyisocyanate selected has an average of from 2.3 to 2.7 NCO units. The most preferred blocking agent for the polyisocyanate is nonyl phenol.

The formulation should have a viscosity such that the formulation is sprayable using a airless sprayer which atomizes the formulation. Preferably the formulation has a viscosity of about 150,000 centipoise or less and more preferably about 100,000 centipoise or less. The formulations of the instant invention preferably have a three to six month storage or shelf life at room temperature but cure at paint oven temperatures, i.e., at a temperature of about 120° C. to about 160° C. Therefore, the blocking agent of the blocked polyurethane prepolymer or the blocking agent of the blocked polyisocyanate is selected so that it preferably is unblocked within this temperature range.

The formulation of the invention can be applied to the panel by any means known in the art, for instance by brushing on, spraying on, spreading on and any other means known in the art. Preferably the formulation is sprayed on the panel. Preferably an airless sprayer is used. Preferably a high volume high pressure airless sprayer which atomizes the composition is used. More preferably the airless sprayer has a 45 to 1 ratio with a double ball or check valve style pump and with an inlet air pressure of about 50 to about 90 psi (344 kPa to 621kPa). Once the formulation is contacted with the substrate, the formulation is allowed to cure. For those compositions where room temperature cure occurs no further steps need to be taken. Room temperature cure generally occurs with amine terminated polyether curing agents. With cyandiamide or dicyandiamide curing agents the coated substrate should be exposed to elevated temperatures to affect cure. Preferable lower cure temperatures are generally about 0° C. or greater more preferably about 40° C. or greater and most preferably about 60° C. or greater and most preferably 120° C. or greater. Preferably the cure temperature is about 190° C. or less, more preferably about 150° C. or less and most preferably about 140° C. or less. Once the formulation is coated on to the substrate, it is preferably cured by heat. Cure temperatures for heat cured coatings are generally the same as in a paint oven, e.g., about 120°0 C. to about 160° C. and more preferably about 140° C. to about 160° C. Preferably, the coating is cured after exposure to curing conditions for 60 minutes and more preferably from about 20 to about 30 minutes. Most preferably the coating is about 1.5 mm or greater and preferably the coating is about 4 mm or less preferably the coating has a thickness of from about 1.5 mm to about 2.5 mm.

The coating of the invention preferably provides a composite loss factor of 0.05 or greater and more preferably 0.1 or greater as measured using the test protocol under method number SAE j1637 with a 2 mm coating.

EXAMPLE 1

A blocked polyurethane prepolymer is prepared as follows. First, 1.2 kilograms of a 3000 molecular weight polypropylene triol (Voranol brand 230-056 from The Dow Chemical Company, Midland, Mich.) is degassed at 100 degrees Centigrade and then cooled to room temperature. Then, 214 grams of toluene diisocyanate is added with stirring and heated to 65 degrees Centigrade until an NCO content of 3.75 percent is reached as determined by infrared spectraphotometry. Then 117 grams of methylethyl ketoxime is added with stirring at 80 degrees Centigrade until the NCO content is essentially zero as determined by infrared spectrophotometry.

The formulation is completed by mixing together the following ingredients: 145.6 grams of the blocked polyurethane prepolymer, 145.6 grams of bisphenol A type epoxy (Araldite brand GY507 from Ciba Specialty Chemicals Corporation), 145.6 grams of aliphatic epoxy resin (DER brand 736 from Dow), 30 grams dicyanamide epoxy curing agent, 17 grams fumed silica (Cab-O-Sil brand TS-720 from the Cabbot Corporation), 5 grams of Ancamine brand 2441 catalyst from Air Products Corporation, 50 grams of calcium oxide, 160 grams of calcium carbonate, 240 grams of talc, 29.1 grams of phthalate plasticizer (Palatinol brand 711P from BASF) and 29.1 grams of odorless mineral spirit. The pressure/flow viscosity of the formulation is 80 seconds to flow 20 grams of the formulation at room temperature through a 0.053 inch orifice at 40 pounds per square inch pressure using a Siever brand viscometer.

The formulation is sprayed onto a test panel and heated to 140 degrees Centigrade for 30 minutes to cure the polyurethane modified epoxy coating on the panel. The coating is 2 mm thick. The panel is subjected to the Gravelometer chip resistance test (General Motors Specification Number 9508P) and the coating does not develop any chips, lifts or adhesion loss.

The vibration damping of the coated panel is tested using the Oberst test method at 200 Hz and various temperatures. At minus 10 degrees Centigrade the vibration loss factor is 0.107. At 1 degrees Centigrade the vibration loss factor is 0.120. At 11 degrees Centigrade the vibration loss factor is 0.148. At 16 degrees Centigrade, the vibration loss factor is 0.151. At 22 degrees Centigrade the vibration loss factor is 0.141. At 33 degrees Centigrade, the vibration loss factor is 0.092.

EXAMPLE 2

A blocked polyisocyanate is prepared as follows. First, 660 grams (5 equivalents) of a polymeric methylene diphenyl diisocyanate having a functionality of 2.3 and an isocyante equivalent weight of 131 polyisocyanate 1 (Dow brand PAPI94) and 220 grams (1.67 equivalents) of a polymeric methylene diphenyl diisocyanate having a functionality of 2.7 and an isocyante equivalent weight of 134 polyisocyanate 2 (Dow brand PAPI27) and 1.5 kilograms (6.81 equivalents) of nonyl phenol are mixed with 2 grams of dibutyl tin dilaurate Dabco brand T12 catalyst from Air Products Company at 100 degrees Centigrade under nitrogen purge until the NCO content is essentially zero as determined by infrared spectraphotometry at 2279 $cm^{-1}$. The resulting blocked polyisocyanate is cooled to solidify it and then ground into a powder having an average particle size of 0.1 to 0.2 millimeters.

The formulation is completed by mixing together the following ingredients: 674 grams of the blocked polyisocyanate, 2320 grams of bisphenol A type epoxy (Araldite brand GY507 from Ciba Specialty Chemicals Corporation), 560 grams of a polypropylene oxide based epoxy resin having an epoxy equivalent weight of 175–205 (DER brand 736 from Dow), 816 grams of polyol (Voranol Brand 230–112 from Dow), 0.9 grams of dibutyltin diactate Dabco Brand T-1 catalyst, 268 grams fumed silica (Cab-O-Sil brand TS-720 from the Cabbot Corporation), 272 grams of boron trichloride amine complex (Leecure Brand 38–239B from Leepoxy Plastics, Inc.), 2400 grams of talc, 1800 grams feldspar, 403 grams of phthalate plasticizer (Palatinol brand 711P from BASF) and 335 grams of odorless mineral spirit. The pressure/flow viscosity of the formulation is 25 seconds to flow 20 grams of the formulation at room temperature through a 0.053 inch orifice at 40 pounds per square inch pressure.

The formulation is sprayed onto a test panel and heated to 140 degrees Centigrade for 30 minutes to cure the polyurethane modified coating on the panel. The coating is 2 mm thick. The panel is subjected to the Gravelometer chip resistance test (General Motors Specification Number 9508P) and the coating does not develop any chips, lifts or adhesion loss.

The vibration damping of the coated panel is tested using the Oberst test method at 200 Hz and various temperatures. At minus 10 degrees Centigrade the vibration loss factor is 0.075. At 0 degrees Centigrade the vibration loss factor is 0.082. At 10 degrees Centigrade the vibration loss factor is 0.095. At 20 degrees Centigrade, the vibration loss factor is 0.100. At 30 degrees Centigrade, the vibration loss factor is 0.095.

What is claimed is:

1. The formulation comprising:
   (a) about 15 to about 25 percent by weight of a blocked polyurethane prepolymer, or a mixture of a blocked polyisocyanate and a polyol;
   (b) about 30 to about 50 percent by weight of an epoxy resin composition comprising one or more aliphatic epoxy resins and one or more aromatic epoxy resins;
   (c) about 20 to about 50 percent by weight of a filler composition comprising one or more spherical fillers and one or more platy fillers; and
   (d) about 3 to about 10 percent by weight of a plasticizer.

2. A method for forming a chip resistant, vibration damping coating, comprising the steps of:
   (I) applying a coating mixture to a substrate, the coating mixture comprising
      (a) about 15 to about 25 percent by weight of a blocked polyurethane prepolymer, or a mixture of a blocked polyisocyanate and a polyol;

(b) about 30 to about 50 percent by weight of an epoxy resin composition comprising one or more aliphatic epoxy resins and one or more aromatic epoxy resins;
(c) about 20 to about 50 percent by weight of a filler composition comprising one or more spherical fillers and one or more platy fillers; and
(d) about 3 to about 10 percent by weight of a plasticizer;

(II) exposing the substrate to conditions so as to cure the coating wherein the resultant cured coating comprises an interpenetrating network of a cured polyurethane and a cured epoxy resin.

3. The method of claims 2, wherein the substrate is exposed to heat so as to cure the coating.

4. A method according to claim 2 wherein the composition further comprises a curing agent for the epoxy resin composition.

5. The method of claim 4, wherein the polyurethane prepolymer comprises toluene diisocyanate partially reacted with propylene glycol and then blocked with methylethyl ketoxime, wherein the epoxy resin comprises a bisphenol A resin, an aliphatic epoxy resin and dicyanamide curing agent, wherein the filler comprises fumed silica, calcium oxide, calcium carbonate and talc, and wherein the plasticizer comprises a phthalate plasticizer.

6. The method of claim 4, wherein the blocked polyisocyanate comprises polymethylene polyphenylisocyanate, wherein the polyol comprises polyethylene glycol, wherein the epoxy resin comprises a bisphenol A resin, an aliphatic epoxy resin and a boron trichloride amine complex, wherein the filler comprises fumed silica, feldspar and talc, and wherein the plasticizer comprises a phthalate plasticizer.

7. The method of claim 4 wherein the substrate is exposed to a temperature of about 120° C. to about 160° C.

8. The method of claim 7 wherein the coating has a thickness of about 1.5 mm to about 4.0 mm.

9. An improved vehicle panel, wherein the improvement is a coating on the panel comprising an interpenetrating network of a cured polyurethane and a cured epoxy resin, the coating comprising
(a) about 15 to about 25 percent by weight of a blocked polyurethane prepolymer, or a mixture of a blocked polyisocyanate and a polyol;
(b) about 30 to about 50 percent by weight of an epoxy resin composition comprising one or more aliphatic epoxy resins and one or more aromatic epoxy resins;
(c) about 20 to about 50 percent by weight of a filler composition comprising one or more spherical fillers and one or more platy fillers; and
(d) about 3 to about 10 percent by weight of a plasticizer.

10. An improved panel according to claim 9 wherein the coating has a thickness of about 1.5 to about 4.0 mm.

11. A composition according to claim 1 wherein the composition further comprises a curing agent for the epoxy resin composition.

12. A composition according to claim 11 wherein the epoxy resin composition further comprises a catalyst for the epoxy resin epoxy curing agent reaction.

13. A composition according to claim 12 wherein the composition has a viscosity of about 150,000 centipoise or less, can be sprayed, and which can form a cured coating which has a composite loss factor of 0.05 or greater according to SAE J1637 for a coating of a 2 mm thickness.

14. A method according to claim 4 wherein the coating mixture is sprayed onto the substrate and has a viscosity of 150,000 centipoise or less.

15. A method according to claim 14 wherein the epoxy resin composition further comprises a catalyst for the epoxy resin epoxy curing agent reaction.

16. A method according to claim 4 wherein the cured coating has a composite loss factor of 0.05 or greater according to SAE J1637 for a coating of a 2 mm thickness.

17. An improved panel according to claim 9 wherein the epoxy resin composition further comprises a curing agent for the epoxy resin composition.

18. An improved panel according to claim 17 wherein the coating further comprises a catalyst for the epoxy resin-epoxy curing agent reaction.

19. An improved panel according to claim 17 wherein the panel demonstrate a composite loss factor of 0.05 or greater according to SAE J1637 using a 2 mm coating.

* * * * *